US006928263B2

(12) United States Patent
Blake et al.

(10) Patent No.: US 6,928,263 B2
(45) Date of Patent: Aug. 9, 2005

(54) LOCAL DATA DELIVERY THROUGH BEACONS

(75) Inventors: Robert L. Blake, London (GB);
Robert J. Davies, Horley (GB); Paul
M. Fulton, Salfords (GB)

(73) Assignee: Koninklijke Philips Electronics N.V.,
Eindhoven (NL)

( * ) Notice: Subject to any disclaimer, the term of this
patent is extended or adjusted under 35
U.S.C. 154(b) by 669 days.

(21) Appl. No.: 09/873,568

(22) Filed: Jun. 4, 2001

(65) Prior Publication Data

US 2001/0055988 A1 Dec. 27, 2001

(30) Foreign Application Priority Data

Jun. 26, 2000 (GB) .............................................. 0015452
Aug. 15, 2000 (GB) ............................................. 0020101

(51) Int. Cl.[7] .............................................. H04B 7/00
(52) U.S. Cl. ..................... 455/41.2; 455/41.1; 455/434;
455/450; 455/518; 455/519
(58) Field of Search ............................... 455/41.1, 41.2,
455/434, 450, 516, 518, 519, 568, 515,
436

(56) References Cited

U.S. PATENT DOCUMENTS 5,835,861 A  11/1998  Whiteside ................... 455/466

6,675,015 B1 * 1/2004 Martini et al. ............... 455/436

FOREIGN PATENT DOCUMENTS

WO    WO0120940    3/2001    ............ H04Q/7/38

OTHER PUBLICATIONS

Albrecht, M.; Frank, M.; Martini, P.; Schetelig, M.; Vilavaara, A.; Wenzel, A.;Local Computer Networks, 1999. LCN '99. Conference on , Oct. 18–20, 1999 pp.: 2–11.*
Haartsen, J.C.;Personal Communications, IEEE [see also IEEE Wireless Communications] ,vol.: 7 , Issue: 1 , Feb. 2000 pp.: 28–36.*

* cited by examiner

Primary Examiner—Nick Corsaro
Assistant Examiner—Raymond Dean
(74) Attorney, Agent, or Firm—Dicran Halajian (57) ABSTRACT

A communications system includes first and second beacon devices capable of wireless message transmission and at least one portable device capable of receiving such message transmissions. The first beacon is arrange to broadcast a series of inquiry messages according to a first communications protocol, such as Bluetooth. The portable device detects such inquiry messages and replies with an identifier for the portable device. The first beacon then transmits the received identifier to the second beacon, with the second beacon and portable device configured to perform a service interaction when triggered by the second beacon receiving the portable device identifier.

10 Claims, 4 Drawing Sheets

LOCAL DATA DELIVERY THROUGH BEACONS

The present invention relates to services offered to users of electronic equipment, especially but not exclusively to users of mobile communications devices such as portable telephones and suitably equipped PDA's (personal digital assistants). The invention further relates to means for delivery of such services, and to portable devices for receiving them.

Recent years have seen a great increase in subscribers world-wide to mobile telephone networks and, through advances in technology and the addition of functionalities, cellular telephones have become personal, trusted devices. A result of this is that a mobile information society is developing, with personalised and localised services becoming increasingly more important. Such "Context-Aware" (CA) mobile telephones are used with low power, short range base stations in places like shopping malls to provide location-specific information. This information might include local maps, information on nearby shops and restaurants and so on. The user's CA terminal may be equipped to filter the information received according to pre-stored user preferences and the user is only alerted if an item of data of particular interest has been received.

An example of a CA terminal is given in U.S. Pat. No. 5,835,861 which discloses the use of wireless telephones within the context of advertisement billboards. The user of a wireless telephone obtains the telephone number of a vendor by activating his/her wireless telephone to transmit a prompt signal to an active advertisement source and to receive from the advertisement source a response signal containing the telephone number of the advertising vendor. The telephone number can then be used to automatically place a call to that vendor via the public switched telephone network. Alternatively, the telephone number can be stored for use later on. This arrangement can be used to place a call to a vendor without having to either memorise the telephone number or to write it down. The signals between the billboard and the caller can be transmitted as modulated infrared (IR) signals.

It will be recognised that an important requirement for CA devices is that they quickly and efficiently gather data from beacons such that the user is not required to undertake actions such as staying close to a beacon whilst contact is established between portable device and beacon, nor having to specifically initiate interaction (as is the case with the above-mentioned system in U.S. Pat. No. 5,835,861).

The existing methodology for implementing a radio beacon is to perform a two-step connection process, commencing with the discovery of devices followed by the actual transmission of the information using the same device. Bluetooth, one of the technologies/protocols available for building such systems, requires that the discovery phase is completed before a transmission can take place. When used in a dynamic mobile environment, the time this process takes can often be longer than the actual time the device is in range, causing the information not to reach the client.

From this it can be seen that two issues are important when relaying information via a beacon to mobile clients, the first of which is the time taken for the transaction to be completed. Due to the mobility of the clients and the typically small range of beacons, the time taken for a transaction to be performed is critical. Should the time for this interaction to be performed in full (i.e. from an inquiry stage to the actual service interaction) be too long, the client will be out of range of the beacon and will not have received the service information.

The second issue is the power consumption of the mobile device. Since the mobile device is required to be compact and light, power consumption is an issue when adding additional functionality to the device. Many individual beacons, each performing their own inquiry will require the device to transmit frequently. Since each transmission requires significantly more power than reception, this can quickly drain the available power.

It is therefore an object of the invention to provide a system for the delivery of data via beacons whereby the establishment of a link between beacon and portable device occurs relatively quickly and without excessive power drain on the portable device.

In accordance with a first aspect of the present invention there is provided a communications system comprising first and second beacon devices capable of wireless message transmission and at least one portable device capable of receiving such message transmissions, wherein said first beacon is arranged to broadcast a series of inquiry messages according to a first communications protocol, wherein said at least one portable device is arranged to detect such inquiry messages and reply with an identifier for the portable device, wherein said first beacon device is arranged to transmit a received identifier to said second beacon, and wherein said second beacon and portable device are configured to perform a service interaction when triggered by the second beacon receiving the portable device identifier.

Whilst the foregoing requires the portable device to go through both an inquiry and paging process, the ability of the first beacon to issue inquiry packets continuously makes the progress quicker. Furthermore, by having the second beacon handle all interactions, the first beacon does not have to pause operation to issue page messages, nor does it have to stop to allow interactive traffic. As a consequence, the portable device never has to wait for the first beacon to enter inquiry mode, which represents a significant saving.

The system may comprise just one or a plurality of second beacon devices, each arranged to receive identifiers from the first beacon, and there is suitably a secure data channel linking the first to the or each second beacon device for the transmission of received identifiers.

The second beacon device may maintain and periodically update a list of identifiers for portable devices with which a service interaction is being performed. To remove redundant entries, the system may feature a timer, with the second beacon device being configured to remove a portable device identifier from the list if no interaction takes place for a predetermined period. As an alternative, or addition, the second beacon device may remove a portable device identifier from said list if a duplicate copy of that identifier is received from said first beacon device. As a yet further alternative, the second beacon device may remove a portable device identifier from the list if the interaction includes receipt of a predetermined message requesting removal from said portable device, that is to say if the user specifically terminates the interaction.

In an extension to the system, each inquiry message may be in the form of a plurality of data fields arranged according to the first communications protocol, with the first beacon device being further arranged to add to each inquiry message prior to transmission an additional data field, and with the at least one portable device being arranged to receive the transmitted inquiry messages and read data from said additional data field. This additional data field, which provides for the piggy-back transmission of broadcast messages on the inquiry messages, is suitably positioned at the end of a respective inquiry message such that it will be ignored by non-broadcast terminals supporting the first communications protocol, which protocol suitably (but not essentially) comprises Bluetooth messaging.

With such broadcasting on the inquiry messages, the first beacon device is suitably configured to broadcast a series of inquiry messages on a predetermined clocked succession of frequencies, with clock information for said first beacon device being included in data carried by said additional data field.

Also in accordance with the present invention there is provided a mobile communication device for use in the above-recited system, the device comprising a receiver capable of receiving a short-range wireless inquiry message, processing means operable to process data contained within said message and compose a response message including an identifier for the device, and transmission means configured to wirelessly transmit said composed response message to the source of the inquiry message.

Further in accordance with the present invention there is provided a communications infrastructure for use with the above mobile communication device in the communications system recited above, the infrastructure comprising first and second beacon devices and an interconnection therebetween, said beacon devices being capable of wireless message transmission to said at least one portable device, wherein said first beacon is operable to broadcast a series of inquiry messages according to a first communications protocol, to detect any response messages containing a portable device identifier for said portable device, and to transmit a received identifier to said second beacon, and wherein said second beacon is configured to perform a service interaction with said portable device when triggered by the second beacon receiving the portable device identifier. In such an infrastructure, the interconnection between the first and second beacon devices may suitably comprise a secure data channel to provide security for the mobile device identifiers.

Such a communications infrastructure may further comprise a plurality of first and/or second beacons, suitably in a networked arrangement. In such an infrastructure, message management means are suitably provided with such means being operable to initiate and effect handover of an ongoing message transmission session from one of said plurality of second beacons to another.

Yet further in accordance with the present invention there is provided a method for enabling the user of a portable communications device to perform a service interaction with a beacon device in an environment containing at least first and second beacon devices capable of wireless message, wherein a first beacon broadcasts a series of inquiry messages according to a first communications protocol, the users portable device detects such inquiry messages and replies with an identifier for the portable device, the first beacon device transmits a received identifier to said second beacon, and the second beacon and portable device perform said service interaction when triggered by the second beacon receiving the portable device identifier.

Further features and advantages of the present invention are recited in the attached claims, the disclosure of which is incorporated herein by reference, and to which the reader is now directed.

Preferred embodiments of the invention will now be described, by way of example only, and with reference to the accompanying drawings, in which.

In the following description we consider particularly a CA application which utilises Bluetooth protocols for communication of messages from beacon to portable device (whether telephone, PDA or other). As will be recognised, the general invention concept linked beacons, together with the subsidiary feature of including a broadcast channel as part of the inquiry procedure, is not restricted to Bluetooth devices, and is applicable to other communications arrangements, in particular frequency hopping systems. The subsidiary feature is described in greater detail in the commonly-assigned and concurrently pending UK patent application no. 0020099.8 entitled "Data Delivery Through Beacons".

Figure 1:
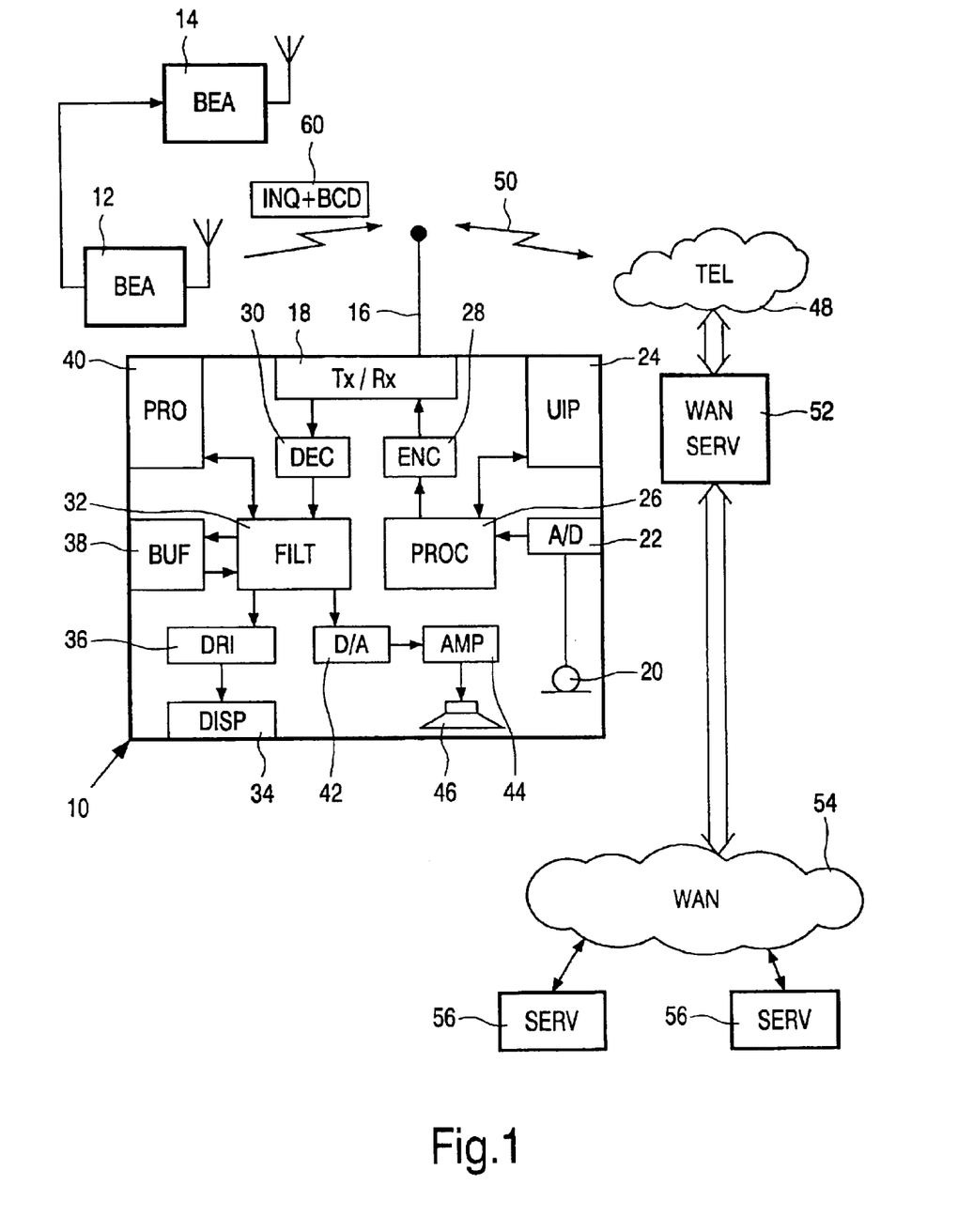
FIG. 1 is a block schematic diagram of a beacon and portable device embodying the invention.

FIG. 1 is a block schematic diagram of a CA mobile telephone 10 in use with a pair of interconnected low power, short range base stations or beacons 12, 14. As mentioned previously, and discussed in greater detail below, such an arrangement may be used in places like shopping malls to provide location-specific information such as local maps, information on nearby shops and restaurants and so on, with a beacon downloading information keys to a mobile device. An information key is a small data object that provides a reference to a source of full information, and it is in the form of a number of predetermined fields, one of which will contain a short piece of descriptive text presented to a user. Another field will be a pointer or address of some form, for example a URL or telephone number. Other supplementary fields may control how the data is presented to a user and how the address may be exploited. A beacon will generally broadcast cyclically a number of these keys, each typically relating to a different service although, as will be recognised, waiting for the appropriate key can sometimes be a time-consuming business.

Issues relating to the beacon construction and configuration include the beacons range which will be dependent on output power (typical range being 1 mW to 100 mW), levels of local interference, and receiver sensitivity.

The user's CA terminal 10 comprises an aerial 16 coupled with transceiver stage 18 for the reception and transmission of messages. Outgoing messages result from user input to the telephone, either audio input via microphone 20 and A/D converter 22 or other data input via the keypad or other input means 24. These inputs are processed to message data format by signal and data processing stage 26 and converted to transmission format by encoder 28 before being supplied to the transceiver stage 18.

Messages received via the aerial 16 and transceiver 18 are passed via a decoding stage 30 to a filtering and signal processing stage 32. If the data carried by the message is for presentation on a display screen 34 of the telephone, the data will be passed to a display driver 36, optionally after buffering 38, with the driver formatting the display image. As will be recognised, the display 34 may be a relatively simple low-resolution device, and the conversion of received data to display data may be carried out as a subset of the processing stage 32 functionality, without the requirement for a dedicated display driver stage.

Where the message is carrying data from one of the beacons 14, the telephone has the ability to filter the information received according to pre-stored 40 user preferences and the user is only alerted (i.e. the information will only be retained in buffer 38 and/or presented on screen 34) if comparison of stored preference data and subject matter indicators in the message indicate that an item of data of particular interest has been received.

For conventional audio messages, the audio data is output by the filter and processing stage 32, via D/A converter 42 and amplifier 44 to an earphone or speaker 46. Receipt of such messages from the telephone network 48 is indicated by arrow 50: the telephone network 48 also provides the link from the telephone 10 to a wide-area network (WAN) server 52 and, via the WAN 54 (which may be the internet), to one or more remote service providers 56 providing a source of data for the telephone 10.

Communication between the CA terminal (telephone 10) and the CA base stations (beacons 12 and 14) takes two forms: 'push' and 'pull'. In 'push' mode, inquiry information is broadcast by the beacon 12 to all portable terminals 10 in the form of a short 'key' indicated at 60. As will be described in detail below, the telephone 10 responds to the inquiry key by sending an identifier for itself to the first beacon 12, which then transfers the interaction to the second beacon 14 whilst the first continues to broadcast inquiry keys.

Other forms of key are received by the terminal 10 'unconsciously', that is, without direct intervention by the user, and automatically filtered according to the user's pre-set preferences by a comparator function applied in processing stage 32. Suitably, the processing stage is operable to apply the comparator function in multiple simultaneous or overlapping copies such as to process in parallel the relatively large number of keys that may be received. Some will be discarded, some kept for further study, others might cause the user to be alerted immediately. By way of example, shops might choose to push details of special offers into passing terminals in the knowledge that users who have interest and have therefore set their filters 32 accordingly will be alerted by their terminal.

Sometimes the user will wish to obtain more information than is contained in the keys. Here, 'pull' mode allows a user to set up a connection with a server 56 (which need not necessarily be specially configured for CA use) and actively request information to pull down into the terminal 10. This mode is therefore typically interactive.

As mentioned above, in the present case, one beacon 12 is labelled as an 'inquirer' beacon and it to sends out Bluetooth inquiry messages constantly. The (or each) other beacons are labelled as 'interactor' beacons and allowed to communicate with terminals 10 on a one-to-one basis on request. Here, the inquiry procedure is performed by an inquirer beacon 12 and the paging procedure by an interactor beacon 14. By delegating the functions this way, it is possible to save a considerable amount of time that would otherwise be lost in attempts to join piconets.

Figure 2:
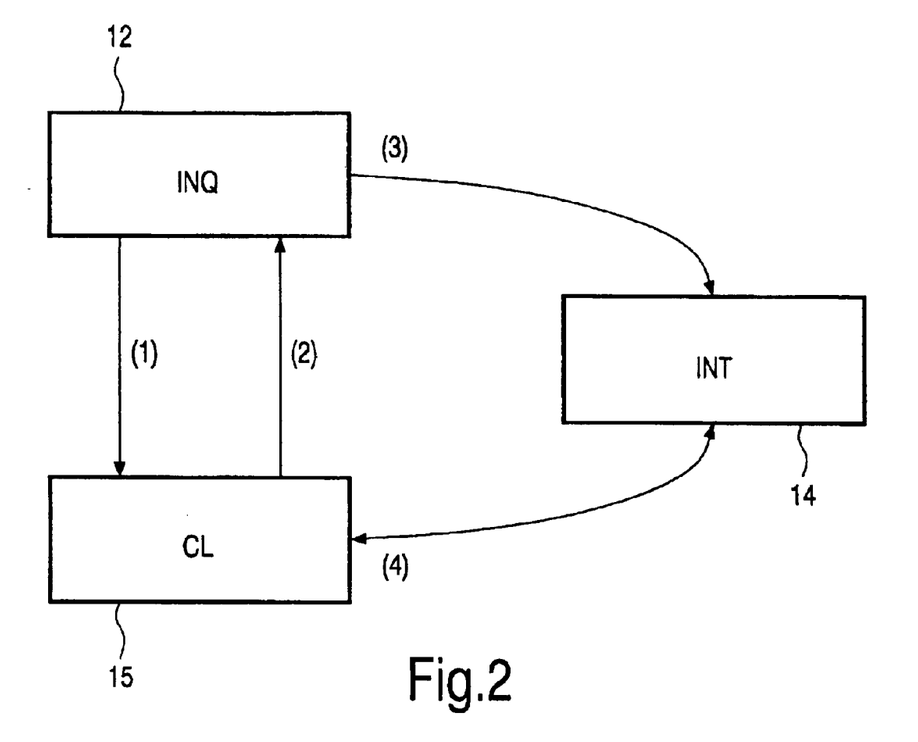
FIG. 2 is a block schematic diagram representing message establishment and hand-over in a system of multiple beacons.

FIG. 2 is a block schematic of a dual beacon system illustrating, by the numbers in parentheses) the sequence of message transmission. In this basic system, there is one inquirer beacon 12 and one interactor 14, although from reading of the following it will readily be seen how the system may be expanded to a networked infrastructure of plural beacons and interactors. The inquirer beacon 12 constantly transmits inquiry packets (1), which are used to discover the identities of any clients—portable devices—in range of the beacon. Once a client 15 comes into range, it will respond to the inquiry (2), giving the inquirer information about its identity.

The information about the client discovered is then transmitted over a secure channel (typically over fixed infrastructure) to the interactor beacon 14 (3)—a beacon solely concerned with transmitting information to the client. This then begins service interaction (4) by issuing a page message containing the client's identity to which the client 15 will respond.

Although the client is obliged to go through the inquiry and paging processes, the fact that the inquirer can issue inquiry packets continuously makes the process much quicker. The use of a separate beacon 14 for all interactions means that the inquirer does not have to pause to issue page messages, nor does it have to stop to allow interactive traffic. The client therefore never has to wait for the inquirer to enter inquiry mode. This in itself is a significant saving of time. As an added bonus, the interactor beacon does not have to wait for an Inquiry cycle to complete before issuing a page message and some seconds can be saved here as well.

Figure 3:
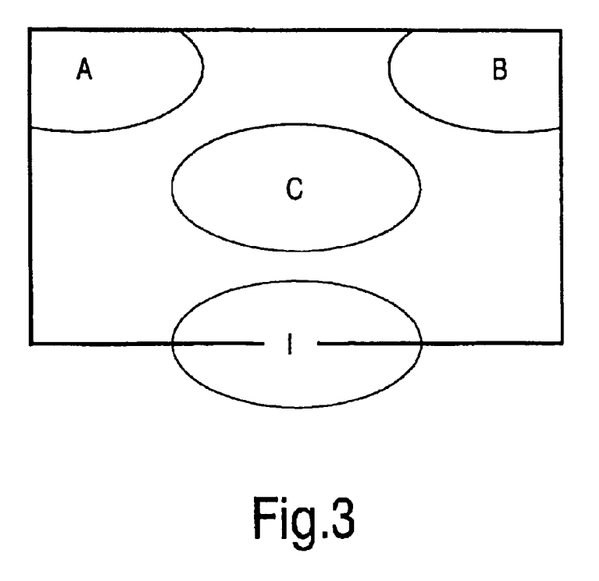
FIG. 3 is an overview of a beacon distribution for an interconnected system in a location such as a shop.

FIG. 3 is a schematic of a multiple beacon network where the idea above can be extended to larger networks containing several interactors A, B, C, and, often, more than one inquirer I.

Multiple interactors can be associated with one inquirer allowing location-specific content to be sent to the client. As with the dual beacon system, the inquirer passes the identities of clients to all interactors in the network. This means that, while a client remains in range of the network, it will only ever have to go through the inquiry process once.

Once the interactors know the identities of the clients, these can then begin the task of performing the service interaction. They can all page all clients continuously. When a client walks within range of one interactor, it will respond to the page by setting up a link with that interactor. The other interactors will typically cease paging for that client until the link is cleared. More advanced paging schemes will page only in nearby cells on the grounds that the user will have to walk through one or more of them before he can reach cells located further away. This way, large systems can page in economical fashion. Other paging strategies are also possible.

An alternative approach is to allow the terminal to request that it be placed in parked mode. In parked mode, the terminal is given a special identity by the interactor (as a Bluetooth master). It then sleeps for much of the time, waking periodically to resynchronise itself to the master and to listen to special beacon messages for possible instructions, including page messages. If the user decides to perform some interaction, the terminal wakes up and requests a link with the master. Interactive operation can then proceed as before.

In the wide area network set up, the terminal's special park mode identity is known to all interactor beacons in the system. This gives the ability for the terminal to enter park mode at one site and wake up at another without the need to go through the inquiry process.

As mentioned, more than one inquirer beacon may be part of the system. A shopping mall might place one at each entrance to the building, for example. Naturally, with such a distributed system, it will not matter at which inquirer beacon the client terminal completes the inquiry process.

By spreading the functions of Inquiry and interaction, considerable savings in time are achieved because the need to sign up to a piconet at each beacon is removed. As it stands, however, the client still needs to request information of the interactor beacons, even broadcast information. This requires the client to transmit and, in so doing, reveal its identity before establishing whether or not the information available is of any interest. A mechanism for sending broadcast information over inquiry packets is described in the above-referenced co-pending application and summarised below with reference to FIGS. 4 to 9, and this scheme can be combined with the distributed fixed part architecture approach just discussed with considerable advantage.

With a multiple beacon network, more inquiry beacons—utilised to offer broadcast information at various locations—could supplement the distributed architecture developed above. A client that wants to know more about a particular piece of information issued by an inquirer can turn to any interactor and set up an interactive link. As a possible bonus, the terminal does not have to submit to the inquiry process as it enters the shopping mall (or other area where the beacons are located) but may hold off until such time as it discovers an interesting broadcast message.

Several other functions can take advantage of a distributed fixed part network. Of these, one of the most important is call hand over or handoff. This function allows a terminal, which has a link active, to transfer the link from one fixed cell to another, ideally (for voice mode) in a seamless fashion. By distributing the management of terminal identities and link functions at the fixed side, hand over in large area, multiple cell fixed networks becomes possible in Bluetooth and similar protocols.

Figure 4:
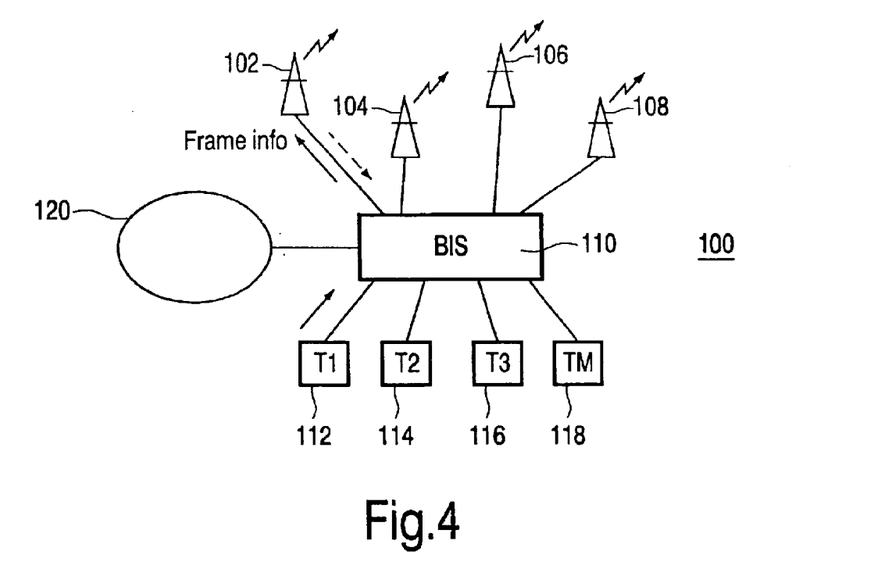
FIG. 4 is a schematic diagram of a series of devices in a linked beacon infrastructure.

Beacons may be wholly or partially networked with at least some co-ordination as to their broadcast messages. FIG. 4 is a diagram of such a system 100 of linked beacons embodying the invention and providing an implementation of an infrastructure for use in, for example, department stores, shopping malls, theme parks, etc. The system 100 comprises a plurality of beacons 102, 104, 106, 108 distributed over a series of locales. Each of the beacons 102–108 broadcasts one or more short-range inquiry signals in a time-slot format as described in greater detail hereinafter. The beacons 102–108 are controlled by a beacon infrastructure server (BIS) 110, with one or more terminals 112, 114, 116, 118 being connected to the server 110. The terminals 112–118 enable service providers, i.e., the users of beacons 102–108, to author or edit allocated service slots in the form of added data piggy backed on inquiry facilitation signals transmitted by beacons 102–108. A service provider may lease a beacon or one of the beacon's service slots from the infrastructure provider. To this end, server 110 provides simple HTML templates for filling out by the user via one of terminals 112–118. Having filled out the template with, for example, a description of the service and other information for the data to be carried via the beacon broadcast, the template is returned to server 110, preferably via a secure link using, e.g., Secure HTTP (S-HTTP) or Secure Sockets Layer (SSL). SSL creates a secure link between a client and a server, over which any amount of data can be sent securely. S-HTTP is designed to transmit individual messages securely. Server 110 then creates the appropriate additional data package for appending to the inquiry signal of a relevant one of the beacons 102–108 based on the information submitted with the template. The system 100 may further comprise an application server 120 to assist in carrying out various functions, as will be readily understood by the skilled reader.

Referring back to FIG. 1, a strong candidate technology for the wireless link necessary for at least the 'push' mode of the above-described CA system is Bluetooth, on the grounds that it is expected to become a component part of a large number of mobile telephones 10. In analysing the Bluetooth protocol for CA broadcast or 'push' mode utilisation, a problem may be seen. In the ideal case, the terminal 10 will detect fixed beacon 12, and extract basic information from it without the terminal 10 needing to transmit at all. However, this type of broadcast operation is not supported by the current Bluetooth specification.

In part, the incompatibility follows the frequency hopping nature of Bluetooth beacon systems which means that, in order for broadcast messages (or, indeed, any messages) to be received by a passing terminal, the terminal has to be synchronised to the beacon in both time and frequency. The portable device 10 has to synchronise its clock to the beacon clock and, from the beacons identity, deduce which of several hopping sequences is being employed.

To make this deduction, the portable device has conventionally been required to join—as a slave—the piconet administered by the beacon as piconet master. Analysis of the inquiry and page procedures indicates that the time taken to join a piconet and then be in a position to receive information from the master could be several tens of seconds, which is much too long for CA applications, where a user may move out of range of a beacon before joining could be completed.

The difficulty of receiving broadcast data from beacons is caused at least partially by the frequency-hopping nature of Bluetooth and similar systems. The Bluetooth inquiry procedure has been proposed specifically to solve the problem of bringing together master and slave: the applicants have recognised that it is possible to piggy-back a broadcast channel on the inquiry messages issued by the master. Only CA terminals need read the broadcast channel messages and only CA base stations or beacons send them. In consequence, at the air interface, the mechanism is entirely compatible with conventional (non-CA) Bluetooth systems.

Figure 5:
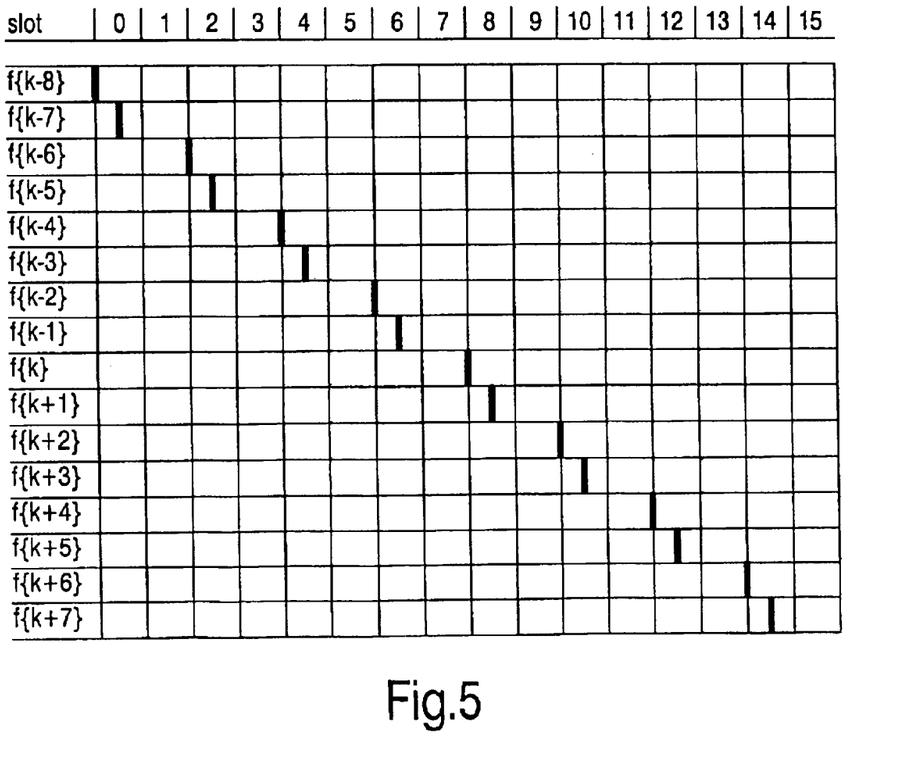
FIG. 5 is a chart illustrating the transmission of a train of inquiry access codes centred on a given frequency.
Figure 6:
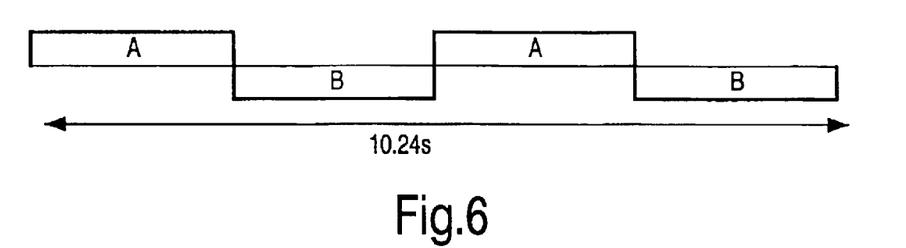
FIG. 6 illustrates alternation between trains of inquiry messages over the duration of an inquiry broadcast.
Figure 7:
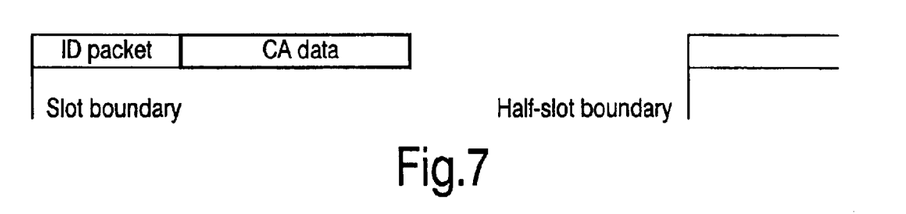
FIG. 7 illustrates the insertion of a packet of broadcast data within an existing transmission slot.

To illustrate how this is implemented, we first consider how the Inquiry procedures themselves operate, with reference to FIGS. 5 and 6. When a Bluetooth unit wants to discover other Bluetooth devices, it enters a so-called inquiry substate. In this mode, it issues an inquiry message containing a General Inquiry Access Code (GIAC) or a number of optional Dedicated Inquiry Access Codes (DIAC). This message transmission is repeated at several levels; first, it is transmitted on 16 frequencies from a total of 32 making up the inquiry hopping sequence. The message is sent twice on two frequencies in even timeslots with the following, odd timeslots used to listen for replies on the two corresponding inquiry response hopping frequencies. Sixteen frequencies and their response counterparts can therefore be covered in 16 timeslots, or 10 ms. The chart of FIG. 5 illustrates the transmission of a sequence on sixteen frequencies centred around $f\{k\}$, where $f\{k\}$ represents the inquiry hopping sequence.

The next step is the repetition of the transmission sequence at least $N_{inquiry}$ times. At the very least, this should be set at $N_{inquiry}=256$ repetitions of the entire sequence which constitutes a train of transmission which we refer to as inquiry transmission train A. Next, inquiry transmission train A is swapped for inquiry transmission train B consisting of a transmission sequence on the remaining 16 frequencies. Again, the train B is made up of 256 repetitions of the transmission sequence. Overall, the inquiry transmissions cycle between transmissions of train A and train B. As shown by FIG. 6, the specification states that this switch between trains must occur at least three times to ensure the collection of all responses in an error-free environment. This means that an inquiry broadcast could take at least 10.24 seconds.

One way to reduce this would be for the switch between inquiry transmission trains to be made more rapidly, i.e. without waiting until the 2.56 seconds for 256 repetitions of the 10 ms to cover the 16 timeslots is up. This may suitably be accomplished by setting the systems to switch over if no inquiry message is detected after say 50 ms, on the understanding that no such message will be detected in the remainder of the present train.

A portable device that wants to be discovered by a beacon enters the inquiry scan substate. Here, it listens for a message containing the GIAC or DIAC's of interest. It, too, operates in a cyclic way. It listens on a single hop frequency for an inquiry scan period which must be long enough to cover the 16 inquiry frequencies used by the inquiry. The interval between the beginning of successive scans must be no greater than 1.28 seconds. The frequency chosen comes from the list of 32 making up the inquiry hopping sequence.

On hearing an inquiry containing an appropriate IAC, the portable device enters a so-called inquiry response substate and issues a number of inquiry response messages to the beacon. The beacon will then page the portable device, inviting it to join the piconet.

As mentioned above and shown in FIG. 6, it is proposed that the inquiry messages issued by the base station have an extra field appended to them, capable of carrying a user-defined payload (CA DATA). In the CA scenario, this payload is used to carry broadcast information, or keys, to CA terminals during the inquiry procedure. By adding the field to the end of the inquiry message, it will be appreciated that non-CA receivers can ignore it without modification. In addition, by using a CA-specific DIAC, CA receivers can be alerted to the presence of the extra information field.

The presence of the extra data field means that the guard space conventionally allowed at the end of a Bluetooth inquiry packet is reduced. However, this space—provided to give a frequency synthesiser time to change to a new hop frequency—will be generally unused otherwise, as current frequency synthesisers are capable of switching at speeds which do not need extension into the extra guard space. The standard inquiry packet is an ID packet of length 68 bits. Since it is sent in a half-slot, the guard space allocated is $(625/2-68)=244.5$ $\mu$s (625 $\mu$s slot period, 1 Mbit/s signalling rate). Modern synthesisers can switch in much less time with figures of 100 $\mu$s or lower considered routine by experts in the field. Applicants therefore propose allocation of 100 bits as a suitable size for this new field, although it will be readily understood that other field sizes are, of course, possible.

CA handsets can receive the broadcast data quickly without being required to run through a lengthy procedure to join a piconet. In addition, since there is no need for the handset to transmit any information whatsoever, there is a consequent power saving that will be particularly important in dense environments where many CA base stations may be present. Nevertheless, when the handset is in interactive mode and wishes to join a piconet in order to obtain more information, it may employ the default inquiry procedures as normal. There is no loss of functionality through supporting the additional data field.

In a typical embodiment, four of our 100 bits will be lost as trailer bits for the ID field; this is a consequence of it being read by a correlator. Of the 96 bits remaining, applicants preferred allocation is that 64 be used as data and 32 as a 2/3 FEC (forward error correction) checksum although the checksum, any headers included, and other overheads may greatly reduce the number of bits available for data, perhaps to 10 bits or fewer in some circumstances. Each inquiry burst thus contains 8 bytes of broadcast data. In a most common scenario, by the second group of A and B trains the portable device has found the base station, understood it to be a CA beacon and is awaiting the broadcast data. Since it will be listening specifically, the portable device will at least be able to read 256 bursts of data twice (A and B), giving us two lots of 2 Kbytes, or 4 Kbytes in total.

Figure 8:
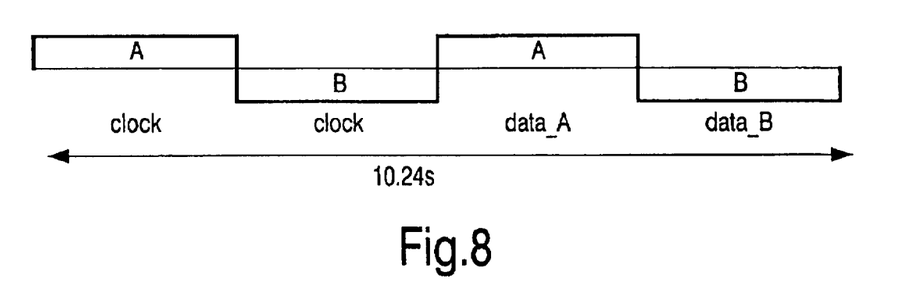
FIG. 8 illustrates a first arrangement for sending beacon clock data in a sequence of inquiry message trains.

At this stage, the portable device does not know the phase of the beacons clock because this information is not been transmitted. To assist the portable device, clock information is transmitted in at least some of the trains in the first A and B groups, as shown in FIG. 8, together with some auxiliary information indicating when the next switches between A and B will occur. This clock information will be transmitted in place of the CA broadcast data so means are provided to discriminate between the two data channels. Use of separate DIAC's is one possible method.

In the case where the portable device knows the timing of the beacon, the portable devices also knows how it will hop, which gives the ability to track all transmissions of a train. Since there are 16 transmissions in a frame, then the resultant CA channel has 16 times as much capacity and can convey 64 Kbytes of information.

Figure 9:
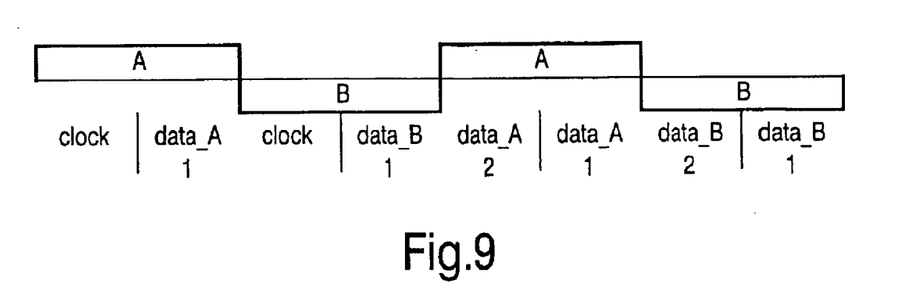
FIG. 9 illustrates an alternate arrangement to that of FIG. 8 for the sending of beacon clock data.

Since the terminal wakes up every 1.28 seconds or less, it will generally have obtained the clocking information it needs by the half way mark in the first A or B periods. Switching from clock to data at these halfway marks, as illustrated in FIG. 9, provides a number of useful advantages. Firstly, some data can be received in less than five seconds from the start of the inquiry procedure. Secondly, the terminal can still respond to an important key by automatically issuing an inquiry response message to the base station (if that is the appropriate action for the terminal to take) even if the key appears comparatively late in the cycle. It will be noted that no increase in capacity is assumed.

In the foregoing, a portable device will receive all the additional data field packets on one of the 32 inquiry channels, thereby using only 1/32 of the available bandwidth. As will be recognised, if the uncertainty as to when a portable terminal (beacon slave) receives the first inquiry packet can be overcome, the predetermined nature of the hopping sequence may be accommodated and the full bandwidth therefore utilised. For a slave to synchronise with a masters inquiry hopping sequence from the point where it received the first packet, the slave needs to know both the masters clock offset and the position of the first received packet in the masters hopping sequence. In the following example, it is assumed that the master follows the Bluetooth minimum enquiry procedure, which comprises 256 repetitions of the 16-channel inquiry hopping sequences, with three train switches (as in FIG. 6). Each sweep across the 16 channels takes 10 ms.

An alternative method of synchronising the slave hopping is to transmit clocking data in every broadcast field. The additional data field (BCD; FIG. 1) carries 4 bytes containing the following information:

Master clock offset (2 bytes);
Number of full train repetitions (1 byte)—assuming that a full train consists of 256 repetitions of 10 ms trains, the range of this parameter is 0–255 (before the inquiry switches to the next full train). This indicates to the slave when the master will next switch the full train.

How many full train switches have been completed in the current inquiry cycle (1 byte)—this data indicates to the slave what the master is likely to do at the end of the current full train, i.e. whether it will switch over to another full train or whether the inquiry procedure will terminate.

As long as no channel repeats in the 10 ms train, no field is required to indicate the position of the current channel in the hopping sequence as the slave is able to derive this from knowledge of the sequence.

From the foregoing it will be seen that, by adding 4 bytes to each additional field packet, the slave can then pick up all additional field packets to the end of the inquiry, whilst still having 4 bytes available (from our preferred assignment of 64 from 100 bits for data) to carry broadcast data.

Considering a complete beacon signal, it will be readily understood that it will need to be divided into a number of 4-byte packets with one being sent with each inquiry packet. Assuming a fixed length of beacon signal for the purposes of illustration, at 16 kB the full signal can be accommodated on a single inquiry train (a train being 256 repetitions of the 16-channel hop sequence, giving 256*16*4 bytes=16 kB).

Extending this, by fixing that the first packet of a beacon signal goes on the first packet of an inquiry train, from the message indicator field for the number of repetitions for the current 16-channel hopping sequence in the message header, the slave is enabled to derive the position of the beacon packet it has received in the complete beacon signal.

From reading the present disclosure, other modifications will be apparent to persons skilled in the art. Such modifications may involve other features which are already known in the design, manufacture and use of fixed and portable communications systems, and systems and components for incorporation therein and which may be used instead of or in addition to features already described herein. As an example, rather than the foregoing scheme of having 4 clock and 4 data bytes in every broadcast packet, other arrangements may be used: an arrangement of 2 clock and 6 data bytes in 15 out of every 16 packets (with 4 clock and 4 data bytes in every sixteenth packet) improves the data carrying capability without necessarily detracting from the synchronisation performance.

What is claimed is:

1. A communications system comprising first and second beacon devices capable of wireless message transmission and at least one portable device capable of receiving such message transmissions, wherein said first beacon is arranged to broadcast inquiry messages, wherein said at least one portable device is arranged to detect said inquiry messages and reply with an identifier for the portable device, wherein said first beacon device is arranged to transmit a received identifier to said second beacon, wherein said second beacon and portable device are configured to perform a service interaction when triggered by the second beacon receiving the portable device identifier, and wherein said second beacon device is configured to remove a portable device identifier from a list of identifiers for portable devices if a duplicate copy of said portable device identifier is received from said first beacon device.

2. A communication system comprising first and second beacon devices capable of wireless message transmission and at least one portable device capable of receiving such message transmissions, wherein said first beacon is arranged to broadcast inquiry messages, wherein said at least one portable device is arranged to detect said inquiry messages and reply with an identifier for the portable device, wherein said first beacon device is arranged to transmit a received identifier to said second beacon, wherein said second beacon and portable device are configured to perform a service interaction when triggered by the second beacon receiving the portable device identifier, and wherein said second beacon device is configured to remove a portable device identifier from a list of identifiers for portable devices if said interaction includes receipt of a predetermined message requesting removal from said portable device.

3. A communication system comprising first and second beacon devices capable of wireless message transmission and at least one portable device capable of receiving such message transmissions, wherein said first beacon is arranged to broadcast inquiry messages, wherein said at least one portable device is arranged to detect said inquiry messages and reply with an identifier for the portable device, wherein said first beacon device is arranged to transmit a received identifier to said second beacon, wherein said second beacon and portable device are configured to perform a service interaction when triggered by the second beacon receiving the portable device identifier, and wherein each inquiry message is in the form of a plurality of data fields, wherein the first beacon device is further arranged to add to each inquiry message prior to transmission an additional data field, and wherein the at least one portable device is arranged to receive the transmitted inquiry messages and read data from said additional data field.

4. A system as claimed in claim 3, wherein the first beacon device is arranged to include an indication in one of said predetermined data fields, said indication denoting the presence of said additional data field.

5. A method for enabling the user of a portable communications device to perform a service interaction with a beacon device in an environment containing at leas first and second beacon devices capable of wireless message, wherein a first beacon broadcasts a series of inquiry messages, the users portable device detects such inquiry messages and replies with an identifier for the portable device, the first beacon device transmits a received identifier to said second beacon, and the second beacon and portable device perform said service interaction when triggered by the second beacon receiving the portable device identifier, wherein the second beacon device removes a portable device identifier from a list of identifiers for portable devices if a duplicate copy of said identifier is received from the first beacon device.

6. A method for enabling the user of a portable communications device to perform a service interaction with a beacon device in an environment containing at least first and second beacon devices capable of wireless message, wherein a first beacon broadcasts a series of inquiry messages, the users portable device detects such inquiry messages and replies with an identifier for the portable device, the first beacon device transmits a received identifier to said second beacon, and the second beacon and portable device perform said service interaction when triggered by the second beacon receiving the portable device identifier, wherein the second beacon device removes a portable device identifier from a list of identifiers for portable devices if said interaction includes receipt of a predetermined message requesting removal from said portable device.

7. A method for enabling the user of a portable communications device to perform a service interaction with a beacon device in an environment containing at least first and second beacon devices capable of wireless message, wherein a first beacon broadcasts a series of inquiry messages, the users portable device detects such inquiry messages and replies with an identifier for the portable device, the first beacon device transmits a received identifier to said second beacon, and the second beacon and portable device perform said service interaction when riggered by the second beacon receiving the portable device identifier, wherein said inquiry messages are each in the form of a plurality of predetermined data fields arranged according to said first communications protocol, wherein the first beacon device adds to each inquiry message prior to transmission an additional data field carrying broadcast message data, and wherein the portable device receives the transmitted inquiry messages and reads the broadcast data from said additional data field.

8. A communications system comprising:
  a first transmitter configured to broadcast inquiry messages;
  second transmitter; and
  a portable device having an identifier and configured to transmit said identifier in response to said inquiry messages;
  wherein said first transmitter is further configured to transmit said identifier to said second transmitter, and said second transmitter is configured to perform a service interaction in response to said identifier, said second transmitter being further configured to remove a portable device identifier from a list of identifiers for portable devices if a duplicate copy of said portable device identifier is received from said first transmitter.

9. A communication system comprising:
  a first transmitter configured to broadcast inquiry messages;
  second transmitter; and
  a portable device having an identifier and configured to transmit said identifier in response to said inquiry massages;
  wherein said first transmitter is further configured to transmit said identifier to said second transmitter, and said second transmitter is configured to perform a service interaction in response to sad identifier, said second transmitter being further configured to remove a portable device identifier from a list of identifiers for portable devices if said service interaction includes receipt of a predetermined message requesting removal of said portable device identifier.

10. A communications system comprising:
  a first transmitter configured to broadcast inquiry messages;
  second transmitter; and
  a portable device having an identifier and configured to transmit said identifier in response to said inquiry messages;
  wherein said first transmitter is further configured to transmit said identifier to said second transmitter, and said a second transmitter is configured to perform a service interaction in response to said identifier, and wherein each inquiry message is in the form of a plurality of data fields, wherein the first transmitter is further arranged to add to said each inquiry message prior to transmission an additional data field, and wherein said portable device is arranged to receive the transmitted inquiry messages and read data from said additional data field.

* * * * *